United States Patent [19]

Köhler et al.

[11] 4,133,309

[45] Jan. 9, 1979

[54] SORBENT MATERIAL AND A RESPIRATOR CONTAINING THE SORBENT MATERIAL

[75] Inventors: Günter A. Köhler, Grant Township, Washington County; Leon W. Anders, Woodbury, both of Minn.

[73] Assignee: Minnesota Mining and Manufacturing Company, Saint Paul, Minn.

[21] Appl. No.: 796,709

[22] Filed: May 13, 1977

[51] Int. Cl.$^2$ .......................... A62B 7/10; A62B 23/06
[52] U.S. Cl. ............................... 128/146.6; 128/142.6; 252/463
[58] Field of Search ..................... 252/463, 471; 55/73, 55/74, 71; 106/73.4; 423/244, 599, 600; 128/142.6, 146.6

[56] References Cited

U.S. PATENT DOCUMENTS

| | | | |
|---|---|---|---|
| 3,230,182 | 1/1966 | Stiles | 252/471 X |
| 3,655,346 | 4/1972 | Cotabish et al. | 128/142.6 X |
| 3,864,459 | 2/1975 | Stiles | 423/244 X |

*Primary Examiner*—W. J. Shine
*Attorney, Agent, or Firm*—Cruzan Alexander; Donald M. Sell; Edward T. Okubo

[57] ABSTRACT

A complex granular material comprising manganese oxide-activated alumina is disclosed. The resulting material can be used in respirators to reduce the sulfur dioxide and HCl intake of the ambient atmosphere.

7 Claims, No Drawings

SORBENT MATERIAL AND A RESPIRATOR CONTAINING THE SORBENT MATERIAL

BACKGROUND OF THE INVENTION

The present invention relates to a granular sorbent material reducing the $SO_2$ content of an atmosphere at room temperature. The $SO_2$ content is reduced by retention of the sulfur values on a $MnO_x$-$Al_2O_3$ solid complex. The exact nature of this retention is not fully understood, but it is apparent that it is not based on the known stoichiometry of the $SO_2$-$MnO_2$ type reaction. The amount of $SO_2$ removed is clearly greater than stoichiometry, or the sum of the stoichiometry and adsorption on alumina; hence, it could be classed as a catalytic reaction.

The $MnO_x$-$Al_2O_3$ complex of this invention is prepared by several methods. One method involves treating granular activated alumina with an aqueous solution of potassium permanganate, followed by drying the solid and thermally decomposing the permanganate to give a complex comprising manganese values in the oxidation states of from 2.5 to 3.5 on an alumina substrate, preferably in the form of a solid solution. We have found that the resultant granular product is especially suited for use as the active component of a respirator to effectively remove $SO_2$ from an ambient atmosphere.

It is well known in the art that $KMnO_4$ will react with $SO_2$ and the prior art suggests the use of this technology to effect the conversion of noxious $SO_2$ to a harmless or otherwise useful product. The reactions involved are:

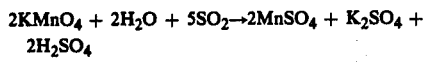

or

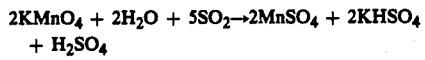

Turk, Mehlman and Levine, *Atmospheric Environment* 7, pp. 1139–1148 (1973), discloses the reduction of various odoriferous compounds by use of permanganate treated carbon or alumina. The $MnO_2$/$Al_2O_3$ medium utilized was prepared by reducing the permanganated alumina in an atmosphere of formaldehyde followed by heating to drive off residual formaldehyde and formic acid.

Hanna, Kuehner, Karnes and Garbowicz, *Ann. N.Y. Acad. Sci.* 116 (2), pp. 663–675 (1964), report a commercial air deodorant system based on a combination of potassium permanganate with activated alumina in the shape of pea-sized balls. They teach that the permanganate must be solubilized (in $H_2O$) to react with odor causing material since "Crystalline potassium permanganate alone will absorb neither the odors nor the moisture necessary for the oxidation reaction to take place." Any water soluble permanganate is reported to be effective with various substrates, e.g., silicas, aluminas, activated clays.

Tarbutton et al., U.S. Pat. No. 2,984,545 (5-16-61) disclose a cyclic process for removing $SO_2$ from waste gases involving the reaction of manganese oxides with $SO_2$ in an aqueous scrubbing system. In Example 1, the inventors state that "Manganese dioxide also was found to be inferior to the mixture of oxides."

Stephens et al., U.S. Pat. No. 3,207,704 (9-21-65) disclose catalysts for oxidation of hydrocarbons and carbon monoxide which comprise manganese oxides ($Mn_2O_3$ and $Mn_3O_4$ are present) on granular alumina. They teach 0.5 to 25 weight percent manganese as the oxide on a transitional alumina comprising 10–85% Chi-, 10–85% alpha-alumina monohydrate and 5–45% amorphous alumina, 0.02–5% $SiO_2$ and a surface area of at least 75 $m^2$/gm.

A. B. Stiles, U.S. Pat. No. 3,230,182 (1-18-66) discloses a catalyst for conversion of hydrocarbons and carbon monoxide consisting of nickel and cobalt chromite on alumina which has manganese oxide ($Mn_2O_3$ and $Mn_3O_4$) as a coating on its surface. The manganese oxides are present on the alumina in the range of 1–12% by weight.

S. R. Zimmerley, U.S. Pat. No. 3,330,096 (7-11-67) discloses the use of manganese nodules for removing $SO_2$ from polluted atmospheres. The manganese nodules contain 24.9% Mn and small amounts of Cu, Ni and Co with about 10% Fe. In addition, they contain other substances in significant amounts such as silica and alumina. It is asserted that the manganese will remove $SO_2$ with 98% or greater efficiency even when the amount of $SO_2$ is present in small concentrations.

Atsukawa et al., U.S. Pat. No. 3,485,014 (12-23-69) describe a cyclic dry oxidation process for removing sulfur dioxide from waste gases utilizing active manganese oxide powder.

Kawahata, U.S. Pat. No. 3,574,562 (4-13-71) discloses utilization of finely divided manganese dioxide to remove $SO_2$ from waste gases.

Spedden et al., U.S. Pat. No. 3,723,598 (3-27-73) disclose a cyclic process for removing $SO_2$ and $SO_3$ from a waste effluent using manganous oxide. MnO is stated to be superior to higher valent manganese oxide.

Atsukawa et al., U.S. Pat. No. 3,798,310 (3-19-74) teach a cyclic process involving dry adsorption of $SO_2$ on $MnO_{1+i}\cdot XH_2O$ where i is 0.5 to 0.8 and X is 0.1 to 1.0. It is futher stated that the manganese oxide has a bulk density between 0.337–0.625 gm/$cm^3$ and surface area of 125–135 $m^2$/gm. Various types of manganese oxides are described.

Kuowenhoven et al., U.S. Pat. No. 3,832,445 (8-27-74) describe removing $SO_2$ from an $SO_2$-$O_2$ containing gas by contacting said gas with CuO supported on particulate alumina, as well as other substrates.

Van Helden et al., U.S. Pat. No. 3,501,897 (3-24-70) also utilize solid materials to remove $SO_2$ from waste gases. Among the solid compounds taught are copper compounds adsorbed on alumina.

SUMMARY OF THE INVENTION

The present invention relates to a granular sorbent material for removing $SO_2$ from ambient air at room temperature. The $SO_2$ content of the air is removed by sorption of the $SO_2$ on granular $MnO_x$-$Al_2O_3$ in what is believed to be a room temperature catalytic reaction.

The granular $MnO_x$-$Al_2O_3$ complex of this invention can be prepared by several methods. The complex comprises manganese values in the oxidation states of from 2.5 to 3.5 combined with an alumina substrate, preferably in the form of a solid solution such that the manganese is present in from about 0.5 to 3%. The resulting granular product is particularly useful as the active component of a respirator to effectively remove sulfur dioxide from an ambient atmosphere. The material is effective in high or low humidity and at room temperature as well as elevated temperatures.

The object of this invention is to provide a granular $MnO_x\text{-}Al_2O_3$ complex useful for the removal of sulfur dioxide and/or HCl from an ambient atmosphere.

A further object of this invention is to provide a granular $MnO_x\text{-}Al_2O_3$ complex wherein the manganese is present in a valence state of from 2.5 to 3.5 and from 0.5 to 3% by weight.

Another object of this invention is to provide a granular product useful for reducing the $SO_2$ and/or HCl content of an ambient atmosphere, wherein the product is a solid solution of manganese oxide and aluminum oxide.

A futher object of this invention is to provide a granular $MnO_x\text{-}Al_2O_3$ complex in the form of a solid solution wherein the valence state of the manganese is from 2.5 to 3.5 and the amount of manganese contained therein is from 0.5 to 3%; and the granular complex effectively removes sulfur dioxide and/or HCl from an atmosphere at room temperature.

DETAILED DESCRIPTION OF THE INVENTION

Workers in smelters, sulfuric acid plants, and chemical operations that use sulfur for reducing purposes, as well as power plants utilizing high sulfur fuels frequently experience ambient atmospheres containing appreciable quantities of sulfur dioxide. Although precautions are taken to channel these operational gases through systems which remove the sulfur dioxide or convert the sulfur dioxide to innocuous forms, the atmosphere in and around such plants frequently contains $SO_2$ in amounts above that which cause a detectable odor (e.g., 3–5 ppm). Similar consideration must be given to workers in steel pickling operations and chemical plants for HCl protection. Thus, the health and safety factors dictate that workers in such areas use some form of respirator to filter out the $SO_2$ and/or HCl from the atmosphere. A granular type material in a respirator which permits easy throughput of the atmosphere with proper efficient removal of essentially all of the $SO_2$ and/or HCl from the atmosphere would provide protection for the workers in such $SO_2$ and/or HCl laden atmospheres.

We have discovered a granular material comprising a manganese oxide-alumina complex, wherein the manganese has a valence of from 2.5 to 3.5 and the manganese content of the granular material is from 0.5 to 3%. Preferably, the manganese oxide-alumina complex is in the form of a solid solution. The granular material can be used in a respirator and retains the sulfur dioxide and/or HCl of an ambient atmosphere and reduces the sulfur dioxide and/or HCl content of the atmosphere going through the respirator to such levels that the requirements as set forth by the National Institute of Occupational Safety and Health (NIOSH) are met. The requirements for NIOSH approval of sulfur dioxide and/or HCl respirators are found in 30 CFR Part 11, Subpart L, Section 11.162-8.

The NIOSH test on a respirator for the $SO_2$ sorbent requires that the effluent gas stream contain no more than 5 ppm $SO_2$ after 30 minutes, when challenged with an air flow through the sorbent of 64 liters per minute, 25° C., 50% relative humidity and containing 500 ppm $SO_2$. Generally, when respirators filled with about 190 cc. of the granular $MnO_x\text{-}Al_2O_3$ complex of this invention are used, the respirator effluent does not contain 5 ppm $SO_2$ until forty minutes or more.

A laboratory test was devised wherein the sorbent (about 8 gm. of granular material) was placed in a glass tube (19 mm. diameter and 33 mm. deep), and exposed to 100 ppm $SO_2$ in air (15 to 20% RH at RT) at a flow rate of 7 liters per minute. The effluent was fed into a Wilks Miran infrared analyzer and the amount of $SO_2$ in the effluent continuously recorded. The time required for the effluent content to reach 10 ppm $SO_2$ was utilized as the measure for this laboratory test. Comparison of a given material in both the NIOSH test and laboratory test revealed that a 40 minute capacity on the NIOSH test was equivalent to a 55 minute laboratory test.

Generally, the $MnO_x\text{-}Al_2O_3$ complex is prepared from granular alumina and a source of manganese. The alumina may be mixed with an aqueous solution of potassium permanganate or manganese (II) nitrate, followed by separating the manganese moiety coated alumina from the excess solution, drying and thermally converting the coated alumina to the $MnO_x\text{-}Al_2O_3$ complex. The concentration of the aqueous manganese solution may be varied from about 1.5–18% by weight depending upon the salt selected. Combinations of manganese (II) sulfate and potassium permanganate may be utilized, or manganese (II) sulfate in an ammoniacal solution with ammonium persulfate may serve as the source of manganese oxide. Although the manganese values originally coat the granular alumina, petrographic microscopic analysis shows that the final granular product may be a coating of a solid solution of $MnO_x\text{-}Al_2O_3$ on a core of $Al_2O_3$, or the granule may have the solid solution of $MnO_x\text{-}Al_2O_3$ substantially penetrating the granular alumina substrate. Analysis reveals that the manganese values are from about 0.5 to 3.0% by weight. In addition, coulometric analysis indicates that the valence of the manganese is somewhere between about plus 2.5 and plus 3.5, x in $MnO_x\text{-}Al_2O_3$ thus being 1.25 to 1.75. Thus, it is evident that the granular material is not $MnO_2$ coated on alumina.

Optical crystallography is the science pertaining to the various optical phenomena that crystalline and non-crystalline materials exhibit when viewed with visible transmitted light. The polarized light (petrographic) microscope is designed to transmit plane polarized light through non-opaque materials in the form of a powder or a cut thin-section of a rock, ceramic, etc. to magnify the image from 20 times to more than 500 times, and to analyze the optical character of the refracted light rays and the interference patterns which these rays generate. This instrument has been long recognized as one of the most powerful analytical tools for studying the interrelationships observed between the various mineral grains found in rocks, the crystal phases and structures developed in finest ceramic materials, and for identifying non-opaque chemical compounds of all kinds.

Perhaps the most important optical property of a light transmitting material is its refractive index, a physical constant inversely relating the velocity of light in a solid (slower) to that in vacuum or air (faster). Thus, the refractive index for air (or vacuum = 1.000), for water = 1.33, for window glass = 1.53, for diamond = 2.42. Refractive index is readily measured on fine particles (5 m$\mu$ or greater) by placing them in a drop of immersion oil on a microscope slide. When viewed through the microscope, the particle will virtually disappear when the refractive index of the two substances match. If the particle is lower in refractive index than the immersion oil, a bright line of light (Becke line) surrounding the interface edge of the particle will appear to move outward into the oil as the microscope objective is slowly raised above the point of focus. On the other hand, if the particle has the higher refractive index, the Becke line will move inward toward the particle using the same relative movement of the objective.

The refractive index measurement is complicated by the fact that only glass and crystals with cubic class symmetry are isotropic and have only one refractive index. All crystals classed in the hexagonal and tetragonal systems exhibit two refractive indices; O (ordinary ray) is a constant value and represents the refractive index measured when the transmitted plane polarized light travels through the grain vibrating perpendicular to the "C" crystallographic axis of the compound; E (extraordinary ray) is a variable refractive index which exhibits a meaningful value only in the special case when the transmitted plane polarized light travels through the crystal perpendicular to the C-axis while at the same time vibrating parallel to the C-axis (the C-axis is horizontal and oriented N-S, parallel to the plane polarized light incident on the crystal).

Compounds which crystallographically and structurally are classified in the orthorhombic, monoclinic, or triclinic systems have three refractive indices, X, Y and Z, representing the three mutually perpendicular principal vibration directions. X represents the refractive index of the fastest rays through the crystal (lowest index), Z is that of the slowest rays (highest index) and Y is always an intermediate value. Measurement of X and Z refractive indices are usually done statistically by looking for particles that match the minimum or maximum of a series of immersion oils.

The particular compound under investigation is boehmite (AlO(OH)) in its synthesized form. It crystallizes in the orthorhombic system with refractive indices listed as X = 1.638, Y = 1.645 and Z = 1.651. When granules of this compound were treated with aqueous solutions of $KMnO_4$ of various strengths ranging from 3–18%, then dried and heat treated at 250° C. for 2 hours, significant changes in some of the optical properties were observed:

1. The refractive indices increased progressively as the concentration of $KMnO_4$ treatment was increased, a likely indication of solid solution between AlO(OH) and MnO(OH) entering the boehmite lattice structure.
2. The double refraction tended to increase progressively. Double refraction (birefringence) is measured by Z-X refractive indices, that difference increasing with manganese concentration; a positive indication of solid solution.
3. The color of the treated grains progressively changed color from white (untreated) to light brown (3–6% $KMnO_4$), to medium brown, to dark brown, in direct correlation with increasing refractive indices and double refraction. Color tended to be uniform throughout a given crystal if thickness was reasonably constant.
4. The optical phenomenon known as pleochroism (change of color in a single grain depending upon the orientation of the vibration direction of the transmitted light with respect to the crystal lattice structure) became progressively more contrasting and noticeable with the concentration of the $KMnO_4$ treatment. This, too, is a positive indication of solid solution.
5. One of the obvious effects of the heat treatment was grain growth and recrystallization of the material, although not precisely measured, crystal size increased in some areas as much as two to four times the original size, and there was a tendency for pseudohexagonal shapes to develop. This helps to account for the formation of solid solutions.

The alumina used in the preparation of the complex manganese oxide-alumina is generally called "activated alumina." By $Al_2O_3$ or activated alumina, we mean boehmite which is AlO(OH) and may contain small amounts of the precursors of boehmite, and the decomposition products of boehmite up to and including $\gamma$-alumina. We also include, in the event that sufficient alkali metal is present, $\beta$-alumina. The size of the granules is from 6 to 30 mesh (3.36 mm. to 0.59 mm.) as determined by U.S. Screen analysis. The use of granular material provides a respirator with acceptable breathing resistance for long-term use in an ambient atmosphere and selection of substantially dust-free alumina eliminates problems of plugging. Activated alumina RA-1 from the Chemical Division of Reynolds Metals Co., or F-1 from Aluminum Company of America have been used.

In the process for preparing the $MnO_x$-$Al_2O_3$ complex, the general steps are:

1. Classifying the activated alumina granules to select a given size range and remove fines.
2. Contacting the activated alumina with an aqueous solution of manganese values.
3. Separating the manganese coated alumina particles from the excess solution of manganese values.
4. Drying the coated particles.
5. Thermal conversion of the manganese values on $Al_2O_3$ to $MnO_x$-$Al_2O_3$ complex.

Generally, the use of finer particle, size alumina yields a product with a higher capacity for sulfur dioxide sorption. For example, a sample prepared with alumina which passed U.S. Screen size 8 (2.38 mm.) and was retained on U.S. Screen size 14 (1.41 mm.) gave 76 minutes to breakthrough of 10 ppm $SO_2$ by the laboratory test. Using alumina which passed screen size 14 (1.41 mm.) and was retained on screen size 25 (0.71 mm.), the same laboratory test showed 121 minutes. Thus, it is possible to dramatically increase the capacity of the granular sorbent material by selection of mesh size. However, important consideration must be given to such things as air flow resistance and channelling. This is especially true when granules are used in a respirator. Channelling may occur with very large granules, whereas unacceptably high air flow resistance is experienced with granules that are too small.

The activated alumina contact with the solution of manganese values requires only a relatively short time. Normally the particles of alumina are poured into the solution of manganese values, for example an aqueous solution of potassium permanganate, and the solution is gently agitated for a few minutes. The concentration of the manganese value solution affects the final concentration of manganese in the $MnO_x$-$Al_2O_3$ complex. For example using a 6% $KMnO_4$ solution, the resulting complex contained 1.06% Mn; a 12% $KMnO_4$ solution resulted in 1.80% Mn and an 18% solution resulted in 2.52% Mn. In addition, the penetration of the $MnO_x$-$Al_2O_3$ complex into the $Al_2O_3$ particle increased with increasing concentration and the extent of formation of solid solution also increased. At the same time, it was observed that some samples of the $MnO_x$-$Al_2O_3$ complex tended to reach a maximum sorption of $SO_2$ when about 6% $KMnO_4$ solution was used; whereas, other samples showed a leveling off of $SO_2$ sorption with higher concentrations. A slight decrease in activity was noted when more concentrated solutions of $KMnO_4$ were used. It is theorized that this decrease may be due to the plugging of the pores of the granular material. (At room temperature, 6% $KMnO_4$ is about the limit of solubility).

After separating the excess solution of the manganese values from the granular material, the manganese-coated alumina is preferably dried. Although the wet granular material may be thermally converted, the particles tend to form a non-uniform coating. For that reason, the drying step is used, and this step may be simply drying in an oven at about 110° C., or in a vacuum heating system at lower temperatures.

Normally the dried material is heated to 250° C. for about two hours to convert the manganese coated alumina to the $MnO_x$-$Al_2O_3$ complex. Heating for much longer times tends to reduce slightly the sorption capacity of the complex. For example, a sample heated at 250° C. for one hour gave a laboratory test of about 65 minutes; at two hours the test was about 75 minutes; at three hours the test was about the same, but after 18 hours heating, the product gave a test of 60 minutes. In testing other samples of the complex, the results were:

| Sample | Time of Heating | Temperature | $SO_2$ Lab Test |
|--------|-----------------|-------------|-----------------|
| A | 120 minutes | 250° C. | 75 min. |
| A | 120 minutes | 300° C. | 65 min. |
| B | 120 minutes | 250° C. | 83 min. |
| B | 20 minutes | 400° C. | 79 min. |
| B | 20 minutes | 500° C. | 74 min. |

Manganese dioxide can be precipitated from solution by the reaction of manganese (II) sulfate with potassium permanganate according to the following reaction:

$$3 MnSO_4 + 2H_2O + 2KMnO_4 \rightarrow 5 MnO_2 + 2H_2SO_4 + K_2SO_4$$

A reaction of this type was run in the presence of activated alumina and dried at 110° C. for two hours. Petrographic microscopic analysis revealed brown staining of the alumina, but no solid solution. The product was tested by the laboratory $SO_2$ test and showed a breakthrough time of 51 minutes for 10 ppm $SO_2$. The dried sample was subsequently heated at 250° C. for two hours. Petrographic microscopic analysis showed the formation of solid solution and the laboratory $SO_2$ test was 66 minutes.

This invention, particularly the method of preparing the $MnO_x$-$Al_2O_3$ complex, will be better understood from the following illustrative Examples.

EXAMPLE 1

Activated alumina (RA-1 from the Chemical Division of Reynolds Metals Co.) was screened to obtain a fraction which passes U.S. Screen No. 8 (2.38 mm.) and is retained on U.S. Screen No. 14 (1.41 mm.) 50 grams of this fraction was added to 100 ml. of an aqueous 6% $KMnO_4$ solution. The mixture was maintained at 30°-50° C. and gently stirred. After two minutes, the solution was filtered from the solid particles by suction and the pink colored granules dried in an oven in air at 110° C. for three hours. The dried granules were placed in trays and inserted in an oven maintained at 250° C. for two hours. The color of the granules changed from pink to brown indicating the decomposition of the product from $KMnO_4$ to a reduced manganese oxide product. Analysis indicated that the granules contained 0.99% Mn, and the oxidation state of the manganese was between 2.5 and 3.5. Petrographic microscopic analysis indicated recrystallization and grain growth as well as a solid solution of $MnO_x$-$Al_2O_3$. Sulfur dioxide sorption by laboratory test was 75 minutes.

EXAMPLE 2

Activated alumina (100 gm.) of Example 1 was added to 120 ml. aqueous 6% $Mn(NO_3)_2$ solution. The mixture was mildly agitated and maintained at room temperature for two minutes. The granules were separated from the solution by suction filtration and dried in a Rotavapor using a water aspirator to evacuate the system and maintaining the temperature at 80° C. for one hour. After drying, the granules were placed in a tray and the tray and granules inserted in an oven maintained at 250° C. for two hours. Petrographic microscopic analysis of the resulting product indicated recrystallization and grain growth as well as a solid solution of $MnO_x$-$Al_2O_3$. Sulfur dioxide sorption by laboratory test was 73 minutes.

EXAMPLE 3

Activated alumina (RA-1 from Chemical Division of Reynolds Aluminum Co.) was screened to obtain a fraction which passes U.S. Screen No. 14 (1.41 mm.) and is retained on U.S. Screen No. 25 (0.71 mm.). One hundred grams of this fraction were added to 200 ml. of aqueous 3.5% $MnSO_4$ $H_2O$ solution. The mixture was maintained for two hours and agitated gently. Aqueous ammonia (28%) was added dropwise to the mixture until the solution was basic (pH~9). The mixture was heated to 100° C. and stirred, and $(NH_4)_2 S_2O_8$ (1.4 gm.) was added slowly. After five minutes, the mixture was filtered by suction and washed several times with hot distilled water, washed twice with 5% aqueous $H_2SO_4$ and finally several times with hot (~50° C.) distilled water. The granular material was dried in an oven in a tray at 110° C. for two hours. Then, the granular material was placed in an oven at 250° C. for two hours. The resulting product was examined with a petrographic microscope and the examination indicated recrystallization and grain growth as well as a solid solution of $MnO_x$-$Al_2O_3$. Sulfur dioxide sorption by laboratory test was 82 minutes.

EXAMPLE 4

Activated alumina (F-1 from Aluminum Company of America) was screened to obtain a fraction which passes U.S. Screen No. 8 and is retained on U.S. Screen No. 14. One hundred pounds of this fraction was added to one hundred pounds of a 6% aqueous solution of $KMnO_4$. The mixture was maintained at about 60° C. and the container was rotated for about 30 minutes. The excess liquid was drained and filtered from the granules. The granules were dried with continuous rotation of the container at about 120° C. for about one hour. The dried granules were transferred to a tray and heated in a forced air oven at 250° C. overnight. A portion of these granules (190 cc.) were loaded into a respirator and tested as per NIOSH test 30 CFR Part 11, Subpart L, Section 11.162-8. The measured service life for 5 ppm $SO_2$ penetration was 40 minutes.

In order to determine the effect of alkalinity on the $MnO_x$-$Al_2O_3$ complex relative to its $SO_2$ sorption capacity, $MnO_x$-$Al_2O_3$ samples were prepared according to Example 1. The alkali metal content of the samples was about 0.4% Na and about 0.4% K. In tests performed with one sample of sorbent material where the sample was subjected to a water extraction and in most cases an additional alkaline treatment after each test, it was found that the presence of alkali metals had a pronounced effect on the $SO_2$ sorption capacity. While KOH treatment apparently poisoned the system, NaOH appeared to restore the original efficiency and the presence of LiOH made the system superior. A decrease in efficiency was experienced by treating the samples with alkaline concentrations higher than 0.5%. The capability of repeated regeneration of the $SO_2$ sorption capacity indicated that the system appeared to act catalytically for the conversion of $SO_2$ to $SO_4$.

In consequence of the beneficial effect of the presence of $Li^+$ and $Na^+$ on the sorption feature of $MnO_x$-$Al_2O_3$, an increase in efficiency of the $MnO_x$-Alcoa alumina was attempted by sodium hydroxide treatment. As shown in the table below, significant improvement was achieved particularly after having the granules exposed to water vapor at 20° C. It will be noted that the untreated sorbent material did not have a particularly outstanding breakthrough time in the laboratory test prior to the treatment with NaOH.

| Preparation Method | $SO_2$ Adsorption Capacity (min.) |
|---|---|
| A. Example 1 utilizing F-1 alumina | 55 |
| B. Modified : 0.1% NaOH in $KMnO_4$ sol. | 64 |
| C. Modified : 0.1% NaOH in $KMnO_4$ sol. exposed to water vapor for 16 hours. | 72 |
| D. Modified : $NaMnO_4$ instead of $KMnO_4$ | 68 |
| E. Modified : $NaMnO_4$ instead of $KMnO_4$ exposed to water vapor for 16 hours | 82 |

An additional experiment was conducted with a sample of $MnO_x$-$Al_2O_3$ prepared as described in Example 1. The sample contained 0.99% Mn, 0.4% Na and 0.4% K. Sulfur dioxide sorption by the laboratory test was 75 minutes. The sample of sorbent material was removed from the test apparatus and placed in a modified soxhlet extractor apparatus. The apparatus was modified so that only cooled water (30° C.) was used to extract the water soluble material from the granules. The extraction was carried out for 16 hours with about five cycles per hour. The sample of granular material was recovered and dried at 110° C. for one hour and then retested by the laboratory test. Sulfur dioxide sorption was found to be 65 minutes. The extraction process and drying was repeated again and the sulfur dioxide sorption was reduced to 40 minutes. The extraction was repeated again, but the moist granules were treated with about 20 milliters of 0.5% NaOH solution for about five minutes. The granules were filtered off and dried for one hour at 110° C. Sulfur dioxide sorption was 65 minutes. Repeating the extraction and sodium hydroxide treatment gave a sulfur dioxide sorption of 78 minutes. The sample was again recovered and extracted as described above and treated with 0.5% KOH. The sulfur dioxide sorption test gave about 2 minutes. The sample was recovered again and extracted and treated with 0.5% NaOH. This dried sample gave a sulfur dioxide sorption of 60 minutes. The sample was again extracted and this time treated with 0.5% LiOH. The reclaimed sample now gave a test of 80 minutes. These results may be summarized as follows:

| Preparation Method | $SO_2$ Laboratory Test |
|---|---|
| Example 1 | 75 min. |
| $H_2O$ extraction | 65 min. |
| $H_2O$ extraction | 40 min. |
| $H_2O$ extraction + 0.5% NaOH treatment | 65 min. |
| $H_2O$ extraction + 0.5% NaOH treatment | 78 min. |
| $H_2O$ extraction + 0.5% KOH treatment | 2 min. |
| $H_2O$ extraction + 0.5% NaOH treatment | 60 min. |
| $H_2O$ extraction + 0.5% LiOH treatment | 80 min. |

If $Al_2O_3$ of the type used in preparing the $MnO_x$-$Al_2O_3$ complex were used as a blank in the laboratory test, the sulfur dioxide sorption varies between about 25 minutes and 40 minutes depending upon the size of the granules. $Al_2O_3$ granules were tested under various conditions as reported below. Certain samples were (1) challenged in the "as received" condition; (2) challenged, extracted with water and then challenged again and (3) challenged, extracted with water and treated with NaOH and then challenged with the results noted. Other samples were (1) extracted with water and challenged and (2) extracted with water and treated with NaOH and challenged with the results indicated.

| Preparation Method | $SO_2$ Laboratory Test |
|---|---|
| RA-1 $Al_2O_3$ granules | 40 min. |
| Extract with $H_2O$ | 22 min. |
| Extract with $H_2O$ + 0.5% NaOH | 34 min. |
| Unchallenged RA-1 $Al_2O_3$ extracted with $H_2O$ | 13 min. |
| Unchallenged RA-1 $Al_2O_3$ + 0.5% NaOH | 15 min. |

The amount of $SO_2$ sorbed in this experiment is clearly in excess of the amount that would react stoichiometrically with manganese if the reactions were

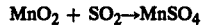

$$MnO_2 + SO_2 \rightarrow MnSO_4$$

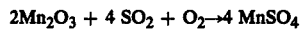

$$2Mn_2O_3 + 4 SO_2 + O_2 \rightarrow 4 MnSO_4$$

Also, the manganese values, if these formed manganese (II) sulfate, would be soluble and extracted by the water extraction.

In addition, in a repeat of Example 1, 2.0036 gm. of the $MnO_x$-$Al_2O_3$ complex challenged with $SO_2$ to the 10 ppm $SO_2$ breakthrough showed 0.99% Mn and 0.85% sulfur by analysis. This represents 0.360 millimoles of manganese and 0.531 millimoles of sulfur. Extraction of this sample with water using the same modified soxhlet extractor showed that the extract contained 0.004 millimoles of manganese and 0.415 millimoles of sulfur.

As noted, we have also found the granular sorbent material of the present invention to be effective in respirators for the filtration of gaseous HCl. Although the nature of the chemical reaction is not understood, we have found that respirators containing granular sorbent material of Example 4 readily passed the NIOSH requirements for HCl respirators contained in 30 CFR Part 11, Subpart L, Section 11.162-8. The NIOSH test requires that the effluent gas stream contain no more than 5 ppm of HCl after 50 minutes when challenged with an air flow through the sorbent of 64 liters per minute, 25° C. 50% relative humidity and containing 500 ppm HCl. When respirators filled with about 190 cc. of the granular $MnO_x$-$Al_2O_3$ complex were tested, the respirator effluent did not contain 5 ppm HCl until 130 minutes.

What is claimed is:

1. Granular sorbent material for the removal of sulfur dioxide and HCl from ambient air at room temperature comprising alumina granules having coated thereon a $MnO_x$-$Al_2O_3$ complex, said manganese being present in a valence state of from plus 2.5 to plus 3.5, x thus being 1.25 to 1.75.

2. Granular sorbent material for the removal of sulfur dioxide and HCl from ambient air at room temperature according to claim 1 wherein said manganese comprises from about 0.5 to about 3 percent of the solid material.

3. Granular sorbent material for the removal of sulfur dioxide and HCl from ambient air at room temperature according to claim 2 wherein said alumina granules have a size range of from about 3.36 mm. to about 0.59 mm.

4. Granular sorbent material for the removal of sulfur dioxide and HCl from ambient air at room temperature according to claim 3 wherein said manganese oxide-aluminum oxide forms a solid solution on a core of $Al_2O_3$.

5. In a respirator for the filtration of $SO_2$ and HCl having a body including a facepiece adapted for peripherally sealing contact with at least that portion of a human head which include the nose and mouth, associated fastening means for holding said respirator in position on the head, and filter media, said filter media comprising granular sorbent material according to claim 1.

6. A respirator for the filtration of $SO_2$ according to claim 5 containing about 190 cc. of granular sorbent material, said respirator upon exposure to an atmosphere containing 500 parts per million of sulfur dioxide at an air flow rate of 64 liters per minute having a breakthrough time to 5 parts per million of sulfur dioxide of at least about 30 minutes.

7. A respirator for the filtration of HCl according to claim 5 containing about 190 cc. of granular sorbent material, said respirator upon exposure to an atmosphere containing 500 parts per million of HCl at an air flow rate of 64 liters per minute having a breakthrough time to 5 parts per million of HCl of at least about 50 minutes.

* * * * *

UNITED STATES PATENT AND TRADEMARK OFFICE
CERTIFICATE OF CORRECTION

PATENT NO. : 4,133,309
DATED : January 9, 1979
INVENTOR(S) : Gunter A. Kohler & Leon W. Anders It is certified that error appears in the above-identified patent and that said Letters Patent are hereby corrected as shown below:

Column 9, line 18, "$SO_4$" should be changed to -- $SO_4^{--}$ --;

Column 10, line 40, after "$MnO_2 + SO_2 \rightarrow MnSO_4$" add the word -- or --;

Column 10, line 53, "0.415" should be changed to -- 0.416 --.

Signed and Sealed this

Seventeenth Day of April 1979

[SEAL]

Attest:

RUTH C. MASON
*Attesting Officer*

DONALD W. BANNER
*Commissioner of Patents and Trademarks*